United States Patent [19]

Okuma et al.

[11] 3,742,220

[45] June 26, 1973

[54] DRIVING MEANS FOR AUTOMATIC CURVED LINE FOLLOWING DEVICE

[75] Inventors: Toshiyuki Okuma; Hisakuni Nagai, both of Tokyo, Japan

[73] Assignee: Fuji Photo Film Co., Ltd., Minami Ashigara-shi, Kanagawa, Japan

[22] Filed: Apr. 20, 1972

[21] Appl. No.: 246,021

[30] Foreign Application Priority Data
 Apr. 20, 1971 Japan.............................. 46/24963

[52] U.S. Cl.............................. 250/202, 318/577
[51] Int. Cl...................... G05b 19/36, G06k 11/02
[58] Field of Search...................... 250/202; 318/577

[56] References Cited
UNITED STATES PATENTS

| 2,172,313 | 9/1939 | Young | 250/202 X |
| 2,468,802 | 5/1949 | Begerow | 250/202 |
| 3,124,692 | 3/1964 | Brouwer | 250/202 |
| 3,496,437 | 2/1970 | Layden | 250/202 X |

Primary Examiner—James W. Lawrence
Assistant Examiner—T. N. Grigsby
Attorney—Richard C. Sughrue, Donald E. Zinn et al.

[57] ABSTRACT

An optical detection system generates signals in response to line deviation of a steering wheel to selectively control clutches which transmit bidirectional motion to the steering wheel of the line following device.

4 Claims, 3 Drawing Figures

3,742,220

DRIVING MEANS FOR AUTOMATIC CURVED LINE FOLLOWING DEVICE

BACKGROUND OF THE INVENTION

1. Field of the Invention

This invention relates to a driving means for an automatic curved line following device which processes a steel plate by automatically following a curved marking line on the steel plate for use in ship-building, bridge construction and the like, and more specifically wherein a steering wheel is operated at an angular speed corresponding to the running speed of the following device regardless of the driving speed thereof.

2. Description of the Prior Art

Automatic curved line following devices have been known in the art and a parent application concerned with an improvement thereof has been filed by the applicant (Japanese patent application No. 52947/69). The line following device is a processing device which carries out a physical or chemical process such as cutting, welding, punching, nibbling and the like while following a line marked on a steel plate. In operation of the line following device, the running speed of the device should be changed according to thickness of the plate to be processed and the kind of process. For example, the running speed of the following device should be lowered when a thicker plate is to be processed with the same torch. Further, the angular speed at which the steering wheel is turned is required to be selected to correspond to the running speed of the device. In other words, the angular speed of operation of the steering wheel should be baried according to variation in running speed of the device.

SUMMARY OF THE INVENTION

In light of the above-mentioned disposition of the conventional devices and requirements therein, the primary object of the present invention is to provide a driving means for a curved line following device wherein the steering wheel is operated at a proper angular speed with respect to the running speed of the following device.

Other objects, features and advantages of the present invention will be made apparent from the following description of a preferred embodiment thereof taken in conjunction with the accompanying drawings.

DESCRIPTION OF THE PREFERRED EMBODIMENT

Figure 1:
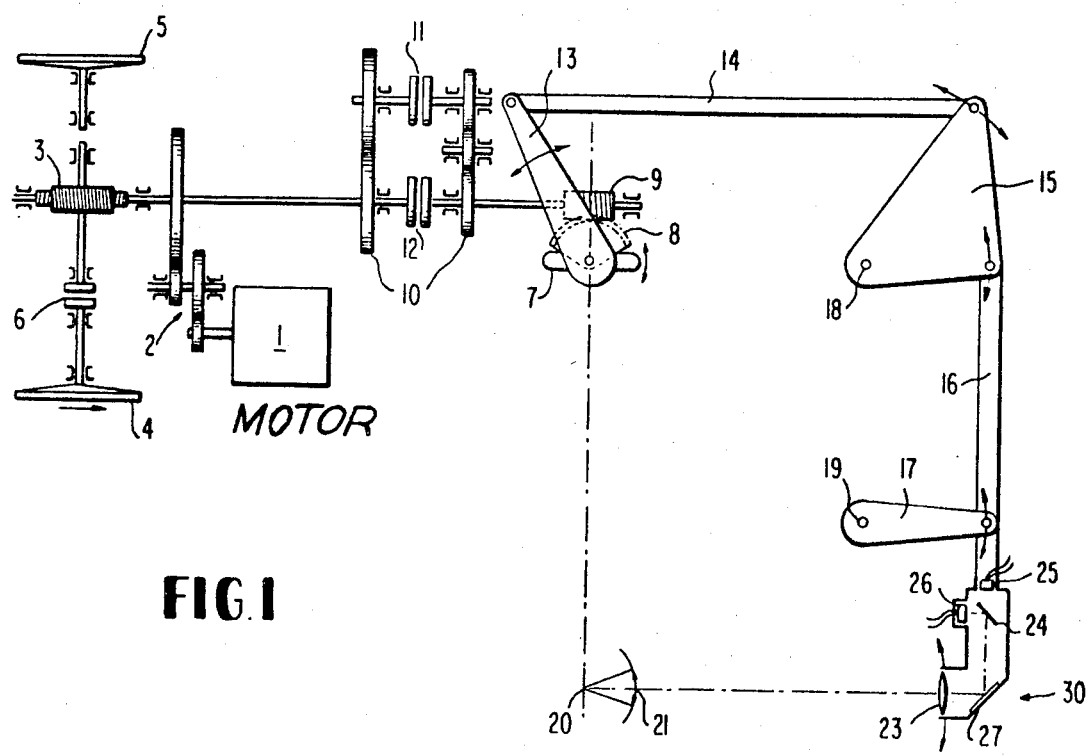
FIG. 1 is a schematic plan view of a curved line following device equipped with an embodiment of the drive means in accordance with the present invention.

The invention will be described referring to the drawings. Referring first to FIG. 1 in which an automatic curved line following device is schematically illustrated, a direct current motor 1 through a reduction gear mechanism 2 and a gear mechanism 3 including a worm wheel drives a pair of rear wheels 4 and 5. One of the rear wheels 4 is a drive wheel and the other wheel 5 thereof is a following wheel. The reference numeral 6 indicates a clutch for transmitting rotation of the gear mechanism 3 to the drive wheel 4. The reference numeral 7 is a front wheel (steering wheel). A rack gear 8 is fixed to the front wheel 7 and meshes with a worm 9. A gear mechanism 10 switches the direction of rotation of the worm 9 and clutches 11 and 12 respectively for forward and backward rotation thereof are included in the gear mechanism 10. The reference numeral 13 designates a first link lever, 14 a second link lever, 15 a link plate, 16 a third link lever, and 17 a fourth link lever. The first link lever 13 is fixed to a rack gear 8 so that the lever 13 may be rotated about the horizontal axis of rotation of the front wheel 7. The link plate 15 and the fourth link lever 17 are pivotally mounted on pivots 18 and 19 respectively. The third link lever 16 is provided at the end thereof with an optical instrument. The optical axis of the optical instrument is inclined to the surface of the steel plate to be processed. In FIG. 1, a line passing through the horizontal axis of rotation of the front wheel 7 and the pivot 18 of the link plate 15 is perpendicular to a line passing through pivots 18 and 19 and to the shaft of the rear wheels 4 and 5. Whichever direction may be given to the front wheel 7, the third link lever 16 is maintained parallel to the rotational shaft of the rear wheels 4 and 5, and the projected image on the steel plate of the optical axis of the optical instrument is maintained perpendicular to the projected image on the steel plate of the shaft of the rear wheels 4 and 5. An intersection of the projected image of the optical axis on the steel plate and a line extending from the axis of rotation of the front wheel, parallel to the shaft of the rear wheels obtained when the front wheel is directed perpendicular to the shaft of the rear wheels, is a point 20 (herein referred to as a "point of process") where a processing tool is effected on the steel plate. An intersection of the optical axis of the optical instrument and the plane of the surface of the steel plate is a detection point 21. The detection point 21 is present between the point of process 20 and the optical instrument when the front wheel 7 is directed in perpendicular to the shaft of the rear wheels 4 and 5. The linkage mechanism is so constructed that there may be a relation as follows between $\theta$, $\theta'$, H and L when $\theta' \neq 90°$ $|\tan \theta - \tan \theta'| = (H/L)$ where $\theta$ is the angle at which the front wheel 7 is inclined to the shaft of the rear wheels 4 and 5, $\theta'$ is the angle at which the front wheel 7 is inclined to the line connecting the point of process 20 and the detection point 21, H is a distance between the steering shaft of the front wheel 7 and the point of process, and L is a distance between the steering front wheel and the shaft of the rear wheels.

For example, where $L = 250$mm, $H = 150$mm, the length of the first link lever 13 is 40mm, the length of the second link lever is 115.06, and the distance between the pivot of the second link lever and the link plate 15 and the pivot 18 of the link plate 15 is 40mm, the angle between the first link lever 13 and the shaft of the rear wheels, when $\theta' = 90°$, is 43.5° which is the same as the angle at which the line connecting the pivot 18 and the pivot of the second link lever 14 and the link plate 15 is inclined to the shaft of the rear wheels 4 and 5, and the line connecting the pivot 18 and the pivot of the link plate 15 and the third link lever 16 is parallel to the fourth link lever 17 and perpendicular to the shaft of the rear wheels and the length of the both is 30mm. The distance between the pivot point of the third link lever 16 and the link plate 15 and the optical axis of the optical instrument is equal to H. The distance between the pivot 18 and the front steering shaft is 60mm and the distance between the point of process 20 and the detection point 21 is 30mm.

Figure 2:
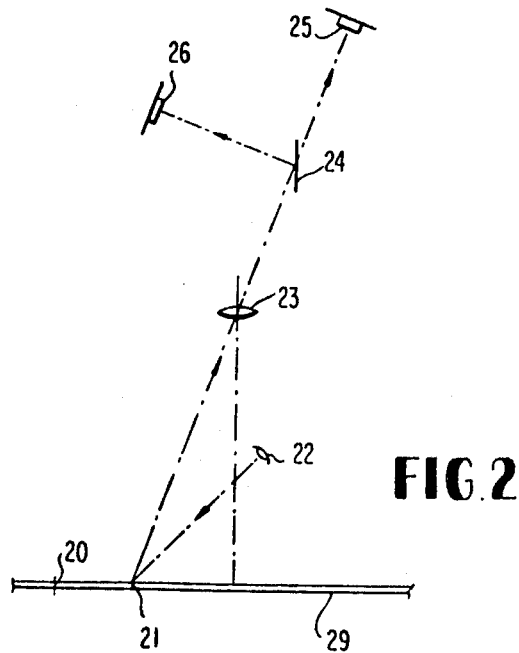
FIG. 2 is a schematic side view of an optical system employed in the automatic curved line following device of FIG. 1.

In FIG. 2 is shown a schematic side view of the optical instrument employed in the curved line following device shown in FIG. 1. Referring to FIGS. 1 and 2, the reference numeral 22 shows an illumination light source, 23 a lens, 24 a half mirror, 25 a first detection element, 26 a second detection element and 27 shows a mirror. A set of two photo-electric conversion elements form the detection elements 25 and 26. The optical axis of the optical instrument is inclined at 70° to the surface of the steel plate 29. The light source 22 provides illumination on the detection point 21 with an incident angle of 45°. The marked line is projected on the detection elements 25 and 26 through the lens 23 and the half mirror 24. For the detection elements 25 and 26, a photoreceptor diode OD72P (made by Oki Electric Ind. Co., Ltd.) which has two diodes arranged in a set is preferably employed. This diode has a quick response property much superior to the conventional CdS and like elements.

Figure 3:
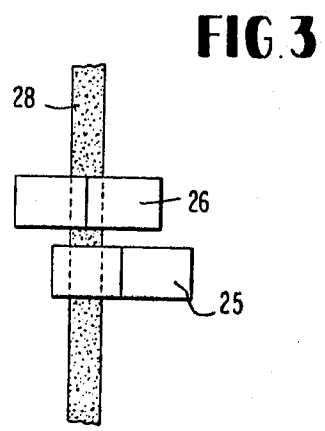
FIG. 3 is an explanatory view showing the relationship between detection elements and a projected image of a marked line.

FIG. 3 shows a relationship between the detection elements 25 and 26 relative to the optical axis of the optical instrument and the curved line to be followed. The reference numeral 28 indicates the curved line mark to be processed along.

In the curved line following device as described hereinabove, the light source 22 is turned on and the amplifiers (not shown) of the detection elements 25 and 26 are operated and the direct current motor 1 is rotated to make the worm 9 rotate in the reverse direction through the clutch 12 upon depression of a starting switch button. The rotation of the worm 9 moves the optical axis of the optical instrument in one direction through a rack gear 8 and the linkage lever mechanism. When the first detection element 25 detects the marked line 28 illuminated by the illumination light source 22, the amount of light received by the detection element 25 is varied and the clutch 6 is switched on with an electric signal generated therefrom. Rotation of the D. C. motor 1 drives the drive wheel 4 to move the device rightward in the drawing. In case where the first element 25 does not detect the marked line 28, the clutch 12 is switched off after the optical axis is moved to a predetermined angle and the other clutch 11 is switched on to move the optical axis in the opposite direction to detect the line. If the marked line is detected this time, the device operates just in the same manner as described hereinbefore. If the marked line should not be detected at all, the device is replaced on the steel plate.

When the first detection element 25 detects the marked line 28, the optical instrument is driven by the operation of the clutches 11 and 12 electrically switched on and off so that the center of the second detection element 26 may be brought into alignment with the marked line 28 and the equal amounts of light may be received by the two detection diodes of the element 26. Simultaneously with the motion of the optical instrument, the front wheel 7 is turned about its steering shaft to determine the direction of advancement of the device. Thus, the device moves along a curved or straight line switching the clutches 11 and 12 on and off. Further, the point of process of the device follows the line hardly getting out of the marked line since the linkage mechanism always satisfies the foregoing formula. By locating a gas burner for cutting the steel plate at the point of process, the steel plate is able to be cut along the marked line.

By use of the line following device having dimensions as described hereinabove, it was possible to automatically detect and follow a marked line of the width of 3.5mm or more having a minimum radius of curvature of 800 mm in the range defined by 15mm from the center of the line with following accuracy of ± 0.5mm or less from the center of the line. Further, since the driving of the device for both running and for steering occurs with one motor, the rotation speed of the drive wheel and the rotation of the drive means for steering are in a constant proportional relationship with each other. The steering wheel is, therefore, operated at a proper angular speed with respect to the running speed of the line following device in the present invention.

What is claimed is:

1. A drive means for a marked line following device which automatically follows a line marked on a steel plate and processes therealong comprising:
   a motor for driving the line following device,
   a drive wheel driven by the said motor,
   a steering wheel driven by the said motor, and
   means disposed between said motor and said steering wheel for transmitting the rotation of the motor to the steering wheel and changing the direction of rotation according to detection signals obtained through a detection means which detects the presence of the marked line.

2. A drive means for a marked line following device as defined in claim 1 wherein: said rotation transmitting means comprises a gear mechanism including a pair of clutches which are selectively operated to transmit the rotation of the motor to the steering wheel in the opposite directions according to said detection signals from the detection means.

3. A drive means for a marked line following device as defined in claim 2, wherein said detection means is an optical detection system operatively coupled to said clutches and which generates electric signals to switch said clutches selectively.

4. A drive means for a marked line following device as defined in claim 1 wherein said detection means is connected with said steering wheel through a linkage mechanism, whereby the motion of the detection means to follow the line causes the steering wheel to turn to follow the line.

* * * * *